UNITED STATES PATENT OFFICE 2,647,089

RECLAIMING RUBBER WITH REACTION
PRODUCTS OF DIALKYLNAPHTHOLS
WITH SULFUR CHLORIDE

William A. Hensley, Quincy, Ill., assignor to The
Firestone Tire & Rubber Company, Akron,
Ohio, a corporation of Ohio No Drawing. Application May 22, 1952,
Serial No. 289,421

2 Claims. (Cl. 260—2.3)

1

This invention relates to the reclaiming of a vulcanized rubbery copolymer of styrene and 1,3-butadiene, and vulcanized mixtures of such copolymer with natural rubber.

This application is a continuation-in-part of my pending application Serial No. 102,168, filed January 29, 1949.

"Reclaiming" as used herein may be understood to mean treating or processing waste vulcanized materials of the class outlined immediately above in such a manner that the products obtained thereby are plastic and processable and thus capable of again being utilized to produce new articles of manufacture.

The vulcanizates which can be reclaimed according to the present invention are the vulcanizates which are well known in the rubber art. For example, they may be obtained by vulcanizing with sulfur, sulfur halides, polysulfides of phenols or cresols, dialkyl xanthogen sulfides, tetraalkylthiuram sulfides, quinones, quinone dioximes, other quinone derivatives, or other compounds known to vulcanize chemically unsaturated elastomers. Vulcanization may be effected with or without an accelerator.

Fundamental to a successful reclaiming operation is the reduction of a vulcanizate to a plastic workable mass. In the case of a vulcanized natural rubber this may be accomplished by heat alone if maintained at a temperature substantially above that at which vulcanization occurred and for a sufficient length of time. In addition, however, certain oils and resins which act as swelling agents, plasticizers or tackifiers (e. g., solvent naphthas, turpentine, dipentene, asphalt, pine tar, rosin, coumarone resins, rosin oil, etc.) are usually added to assist the process.

Also useful but to be distinguished from the oils and resins last mentioned are certain chemicals which act catalytically to hasten the reclaiming process rather than in a solvent or lubricating manner. Natural rubber has, for example, been reclaimed using such catalytic acting chemicals at temperatures as low as 150° F.

With the advent of so-called GR-S type synthetic rubber (butadiene-styrene copolymer) during World War II new problems confronted the reclaimer. Vulcanizates of GR-S do not behave as do those of natural rubber. Rather than having a softening or plasticating effect, heat renders them harder and more unworkable. Large portions of oils of the solvent or lubricating variety were necesary to produce a workable material. But due to the large quantities of oils used, the physical properties of the resultant material were very poor. Therefore, catalytic type

2 reclaiming additives, which will be active in relatively small amounts and especially those effective on synthetic rubber, become very important.

An object of this invention is to provide a method of reclaiming synthetic rubbers, particularly those of the butadiene-styrene copolymer type.

Another object is to provide an improved method for the reclaiming of vulcanized mixtures of 1,3-butadiene-styrene copolymer and natural rubber.

A still further object is to provide reclaimed vulcanizates having improved physical properties.

The above and further objects will be manifest in the description of the invention which follows.

It has been found that vulcanized rubber and rubber-like materials may be satisfactorily reclaimed and the reclaiming operation may be materially speeded up if small proportions of the reaction products formed by reacting a dialkylnaphthol with a sulfur chloride are added to the reclaiming batch before heating. Such reaction products are of particular value in the reclaiming of vulcanized GR-S type synthetic rubber and vulcanized mixtures containing both GR-S and natural rubber. The amount of reaction product required to achieve the desired result is not critical and may well be varied from 0.50 to 10 parts by weight for every 100 parts of vulcanized scrap.

The preparation of the reaction products, necessary for the practice of the invention, is conveniently realized by dissolving a dialkylnaphthol in a suitable solvent such as ethylene dichloride, introducing sulfur chloride and refluxing the mixture until the reaction is complete. The solvent and unreacted starting material may then be removed by distillation. Though products produced by sulfur monochloride are preferred, products produced from all sulfur chlorides are active and thus may also be used in practicing the invention.

Many dialkylnaphthols react with a sulfur chloride to produce products suitable as reclaiming agents in accordance with the invention. Some of such naphthols are as follows:

1,6-di-tert-butyl-2-naphthol
1,6-dimethyl-2-naphthol
1,5-dimethyl-2-naphthol
2,6-dimethyl-1-naphthol
2,7-dimethyl-1-naphthol
2,3-dimethyl-1-naphthol
1-methyl-6-t-butyl-2-naphthol
2-methyl-4-t-butyl-1-naphthol
1-methyl-3-t-butyl-2-naphthol Though the above reaction involved is not entirely understood, the basic structure of the products of the reaction is believed to consist of two or more dialkylnaphthol nuclei joined together by sulfur bridges, such bridges each consisting of one or more sulfur atoms (probably one to four). Furthermore, it is believed that the resultant product is not a single compound but rather a mixture of mono-, di-, tri-, and tetra sulfides of the dialkylnaphthol used as a starting material. Those reaction products are preferred which result from reacting respectively, in approximately a 2:1 mole ratio, a dialkylnaphthol and a sulfur chloride. In this case the products obtained are believed to consist of two dialkylnaphthol nuclei joined together by the sulfur bridge mentioned above. Additionally, however, the reaction products are also effective which are obtained by reacting a larger proportion of a sulfur chloride than the theoretical amount required for the production of the above di(dialkylnaphthol) sulfides. In this case the resultant products are believed to have resin-like structures consisting of a series of more than two dialkylnaphthol nuclei, the adjacent dialkylnaphthol nuclei in each instance being connected by a sulfur bridge. Regardless of the possible theoretical mechanism involved, it has been found that these crude reaction products are meritorious reclaiming agents as such.

As an illustration of the preparation of the reaction products useful in the practice of the invention, 1,6-di-tert-butyl-2-naphthol was prepared by dibutylating 2-naphthol according to the following procedure. Two hundred and twenty grams of tert-butyl chloride, 144 g. of 2-naphthol and 20 g. of zinc chloride were mixed together and refluxed for two hours. Since the mixture tended to solidify, 200 c. c. of gasoline was added to the reaction mixture to facilitate stirring and refluxing was continued for an additional hour. Additional gasoline in the amount of 200 c. c., 20 g. additional butyl chloride and 3 g. additional zinc chloride were added and refluxing was continued for another two hours. Small portions of aluminum chloride were then added to the reaction mixture over a period of one hour. During this same one hour period two additional 20 g. portions of butyl chloride were added to the reaction mixture. After an additional one hour refluxing the reaction mixture was poured into water and the resulting organic layer was decanted off. The organic layer was then dissolved in ether and washed with water and 3% sodium hydroxide. The ether solution was then treated with decolorizing carbon and filtered. The ether of the filtrate was evaporated off, the residue was taken up in gasoline and upon cooling needle-like crystals formed. Recrystallization produced 95 g. of white crystalline 1,6-di-tert-butyl-2-napthol having a melting point of 132.5° to 133° C.

Ten grams (0.04 mole) of the above dibutylated 2-naphthol dissolved in carbon tetrachloride was introduced into a reaction flask. Two and seven tenth grams (0.02 mole) of sulfur monochloride dissolved in carbon in carbon tetrachloride was introduced into the flask. Hydrochloride acid was evolved during the reaction. After the reaction was complete, the carbon tetrachloride was evaporated off leaving a crude, dark brown plastic solid product.

Quite advantageously the crude reaction products of a sulfur chloride and a dialkylnaphthol can be used without further treatment to produce the desired result of the invention. The above prepared crude reaction product was therefore used to produce the results of the following illustrative example.

*Example 1*

Indicative of value of a reclaimed rubber are the following qualities—softness, body, tack, and sheeting facility. "Softness" (which may be characterized as lack of "nerve") may be determined by setting a refining mill to such a spacing that a piece of soft lead when passed between the rolls of the mill is squeezed to a thickness of 0.005 inch. The thickness of a sheeted reclaim is a function of the degree of softening of such reclaim—the greater the thickness of the sheeted reclaim, the less the softening and vice versa.

"Body" is that property of a reclaimed rubber which permits it to be stretched without tearing and having undue surface irregularities. "Tack" is a quality of adhesiveness which is desirable in reclaimed rubber in that it facilitates fabrication of a composite article in which one element must be adhered to another before the article is vulcanized. Since the two qualities last mentioned do not lend themselves well to instrument evaluation, they are customarily determined by hand estimation.

The body ratings used in establishing the merit of the present invention were estimated by observing the stretch or elongation of a refined sheet stretched by hand and by the appearance and uniformity of the stretched sheet, and were recorded as good (G), fair (F), poor (P), tough (T), and lacey (L) or some combination thereof.

Tack was estimated by laying a portion of the refined reclaimed sheet across the hand and then pressing the thumb and first finger together. When the thumb and first finger were spread apart, a small but definite force was required to separate the two adhering surfaces. A rating of 5 was given to the force required to separate a sheet of typical natural rubber whole tire reclaim. Milled crude rubber was given a rating of 10, and crude GR–S with no tack was given a rating of 0. (The higher the number the better the tack.) Values between these assigned controls were estimated by the observer and could be duplicated easily by different independent observers with an accuracy of plus or minus one unit.

The facility of sheeting was noted by which roll the sheet adhered to on each pass (F—fast roll, S—slow roll, N—neither roll). Best sheeting is reflected by adherence to the fast roll, poorest by adhering to neither.

A 200 gram batch of the following formula including the above reaction product was mixed for ten minutes in a Baker-Perkins mixer.

| | Parts by weight |
|---|---|
| Ground GR–S tread scrap (5 mesh) | 100 |
| Dipentene fraction[a] (B. P. 173–201° C.) | 6 |
| Coumarone indene resin[b] | 6 |
| Dibutyl-2-naphthol-$S_2Cl_2$ Reaction product | 1.5 |

[a] Solvenol, supplied by Hercules Powder Company.
[b] A light colored, flaky, medium hard solid which had a melting point of 115° to 125° C. and was supplied by the Barrett Division Allied Chemical and Dye Corporation under the trade designation "Cumar 2½MH."

The mixed batch was then cooked for 4 hours in a pan heater at 175 p. s. i. steam pressure (377° F.). The batch was then dried, cooled, millmassed and subjected to three refining passes. Sheeting facility was recorded after each pass.

Thickness, body and tack were observed and recorded after the third refining pass as follows.

| | |
|---|---|
| Thickness _____inch__ | 0.009 |
| Body _____ | F+ |
| Tack _____ | 5+ |
| Sheeting _____ | FFF |

The value of the reaction products of the present invention becomes apparent by comparing the results obtained above in accordance with invention with results obtained in a run made in the absence of any of such reaction products but with all other variables identical. A 200 gram batch of the following formula was mixed for ten minutes in a Baker-Perkins mixer.

| | Parts by weight |
|---|---|
| Ground GR–S tread scrap (5 mesh) _____ | 100 |
| Dipentene fraction[a] (B. P. 173°–201° C.) __ | 6.75 |
| Coumarone indene resin[b] _____ | 6.75 |

[a] Solvenol.
[b] Cumar 2½ MH.

(It should be noted that the total weight of materials added to the scrap rubber here is the same as the total weight including a reclaiming agent of the present invention added in the example.) The batch was then dried, cooled, mill-massed and subjected to three refining passes. The observations and results were taken and recorded as before with the following results.

| | |
|---|---|
| Thickness _____inch__ | 0.020 |
| Body _____ | P–L |
| Tack _____ | 1– |
| Sheeting _____ | SSF |

The product here obtained, without benefit of the use of dialkylnaphthol reaction products, was of very inferior quality and could not be considered as reclaimed.

The invention is not limited to the specific conditions of quantities set forth herein. The temperatures set forth above, though preferred, are not critical and may well be varied within a range of 150° to 550° F. depending largely upon process and commercial considerations. Other variations appearing naturally to those skilled in the art are within the contemplation of the present invention.

What is claimed is:

1. A process of reclaiming a vulcanized rubbery copolymer of styrene and 1,3-butadiene which comprises heating the vulcanized copolymer in the presence of the reaction product of 1 mole of a sulfur chloride and 2 moles of 1,6-di-tert-butyl-2-naphthol.

2. A process of reclaiming a mixture of vulcanized natural rubber and vulcanized rubbery copolymer of styrene and 1,3-butadiene which comprise heating the mixture in the presence of the reaction product of 1 mole of a sulfur chloride and 2 moles of 1,6-di-tert-butyl-2-naphthol.

WILLIAM A. HENSLEY.

References Cited in the file of this patent

UNITED STATES PATENTS

| Number | Name | Date |
|---|---|---|
| 2,359,122 | Kirby et al. _____ | Sept. 26, 1944 |